United States Patent [19]

Ogawa

[11] Patent Number: 5,209,976
[45] Date of Patent: May 11, 1993

[54] STRUCTURE HAVING A SURFACE COVERED WITH A MONOMOLECULAR FILM

[75] Inventor: Kazufumi Ogawa, Hirakata, Japan

[73] Assignee: Matsushita Electric Industrial Co., Ltd., Osaka, Japan

[21] Appl. No.: 781,673

[22] Filed: Oct. 24, 1991

Related U.S. Application Data

[63] Continuation of Ser. No. 373,186, Jun. 29, 1989, abandoned.

[30] Foreign Application Priority Data

Jul. 4, 1988 [JP] Japan .................. 63-166128
Jul. 4, 1988 [JP] Japan .................. 63-166130

[51] Int. Cl.$^5$ .................. B32B 1/00; B32B 25/20
[52] U.S. Cl. .................. 428/391; 428/367; 428/375; 428/379; 428/392; 501/95
[58] Field of Search .............. 428/379, 391, 392, 367; 501/95

[56] References Cited

U.S. PATENT DOCUMENTS

| 2,531,571 | 11/1950 | Hyde | 428/391 |
| 2,563,288 | 8/1951 | Steinman | 428/391 |
| 3,859,320 | 1/1975 | Atherton | 428/391 |
| 4,188,454 | 2/1980 | Foley et al. | 428/391 |
| 4,636,437 | 1/1987 | Algrim et al. | 428/391 |
| 4,761,316 | 8/1988 | Ogawa | 428/64 |

Primary Examiner—Patrick J. Ryan
Assistant Examiner—J. M. Gray
Attorney, Agent, or Firm—Stevens, Davis, Miller & Mosher

[57] ABSTRACT

A surface-protected structure having a surface covered with a monomolecular adsorbed film of a silane-type surface active agent, which film is formed on the surface of a fine particle or fiber containing OH groups by a chemical adsorption reaction between silicon atoms of the silane-type surface active agent and the OH groups of the fine particle or fiber. Ultra-fine particles having the above structure exhibits little property deterioration and have excellent resistance against environment, and a filler having high resistance to peeling is also provided.

16 Claims, 4 Drawing Sheets

STRUCTURE HAVING A SURFACE COVERED WITH A MONOMOLECULAR FILM

This application is a continuation of application Ser. No. 07/373,186 filed Jun. 29, 1989 is now abandoned.

BACKGROUND OF THE INVENTION

The present invention relates to a structure in which the surface of a fine particle or fiber is covered with a monomolecular adsorbed film. More specifically, the present invention seeks to provide a ultra-fine particle stabilized against environment and a highly reliable filler to a synthetic resin.

In a conventional process for producing ultra-fine particles, in general, a metal or metal oxide is evaporated and solidified in a vacuum.

The above process makes the production easy. However, when it is used to produce ultra-fine particles of a metal active to air such as Mg, Al or the like, the particles ignite spontaneously by contact with air and proceed with an oxidation reaction. Thus, the process has a troublesome problem that the particles are dangerous and have a poor shelf life.

In a conventional process for modifying or extending synthetic resins, oxide such as $SiO_2$, $Al_2O_3$, or the like or fine particles or fibers of Fe or Al are dispersed in the resins.

Although the production by the above process is easy, a modifier or extender is merely mixed with the resin, and the product therefore shows a defect that when it is used for a long period of time, a material of the resin is separated from the surface of fine particles or fibers to cause cracks and clouding.

Further, U.S. Pat. No. 4,539,061 proposes a technique of forming a monomolecular film on a substrate by chemical adsorption.

Furthermore, in U.S. Pat. No. 4,761,316, the present inventors have proposed the formation of a protective film on a surface of a magnetic recording medium by chemical adsorption of a silane surface active agent.

SUMMARY OF THE INVENTION

It is an object of the present invention, in view of the defects of prior art, to provide a process for the production of ultra-fine particles stable and free from quality deterioration even in use in air, which comprises chemically bonding a surface active agent to the surface of a ultra-fine particle to form a monolayer of the surface active agent in a monomolecular state.

It is another object of the present invention to provide a process for producing a synthetic resin free from quality deterioration even in use for a long period of time, which comprises chemically bonding a surface active agent to each of the surfaces of ultra-fine particles or fibers for a filler, or to improve reliability of the synthetic resin.

The present invention seeks to stabilize a fine particle against oxygen and water by means of chemical adsorption of a silane surface active agent, as a protective film, directly on a surface of the fine particle or fiber, the silane surface active agent being adsorbed in a monomolecular state. The fine particles and fibers of this invention are used as a filler to a synthetic resin.

That is, in the present invention, since a monolayer of a monomolecular film having an outward arrangement of hydrophobic groups is formed directly on the surface of an ultra-fine particle, it is possible to stabilize the ultra-fine particle without impairing its inherent properties.

Further, since the present invention makes it possible to form a monomolecular organic thin film which is chemically bonding directly to the surface of a filler, the function of this invention is that the monomolecular organic thin film can maintain very high adhesion to a resin without causing separation.

BRIEF DESCRIPTION OF THE DRAWINGS

FIG. 1 is a conceptual diagram, and FIG. 2 is a diagram of an encircled portion A in FIG. 1, enlarged up to a molecular level, in which a ultra-fine particle manufactured has natural oxide formed on its surface.

FIG. 4 is a conceptual diagram of a fine particle, FIG. 6 is a conceptual diagram of FRP, and FIGS. 5, 7 and 8 are diagrams of an encircled portion A in FIG. 4, enlarged up to a molecular level, in which an adsorbed monomolecular film is formed on a ultra-fine particle or fiber.

DETAILED DESCRIPTION OF PREFERRED EMBODIMENTS

The present invention will be further illustrated by referring to Examples hereinbelow, however, is not limited thereto.

EXAMPLE 1

One embodiment of the present invention will be explained by referring to FIGS. 1 to 3.

Figure 1:
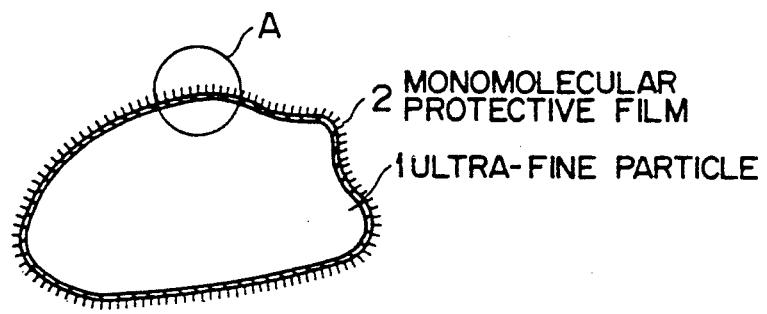
FIGS. 1 and 2 show cross sections of a ultra-fine particle as a first embodiment of the present invention.
Figure 2:
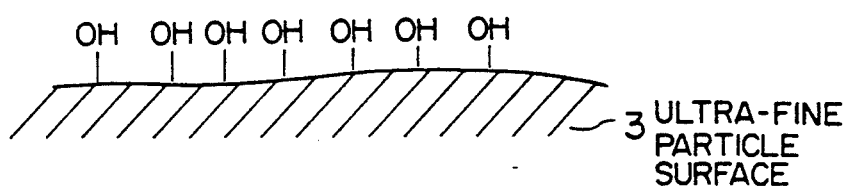

A metal (or metallic oxide) is, for example, evaporated and solidified in a vacuum to form, as shown in FIG. 1, a ultra-fine particle 1 (of Fe, Ni, Co, W, Mo, Cu, Al, Mg, Ti, etc., or oxide thereof) having a size of a few microns, and then the ultra-fine particle is dispersed, in situ, in an organic solvent such as chloroform in an inert atmosphere of $N_2$ gas, etc., to allow a silane surface active agent to be adsorbed, by a chemical adsorption, directly on the entire area of the surface of the ultra-fine particle, thereby to form a monomolecular protective film 2 of the silane surface active agent. For example, $CH_3$—$(CH_2)_n$—$SiCl_3$ having a straight hydrocarbon chain (n is an integer and those in which n is about 10 to about 25 are easy in handling) is used as a silane surface active agent, and the above ultra-fine particle is immersed in a solution of a 80 wt. % n-hexane, in which from about $2 \times 10^{-3}$ to about $5 \times 10^{-2}$ mol/l of the silane surface active agent is dissolved, 12 wt. % carbon tetrachloride and 8 wt. % chloroform. In this case, since natural oxide is generally formed on the surface of the ultra-fine metal particle 1 with the passage of time, a surface 3 contains —OH groups (FIG. 2). As a result, the —$SiCl_3$ group reacts with the —OH group to eliminate hydrochloric acid and form

Figure 3:
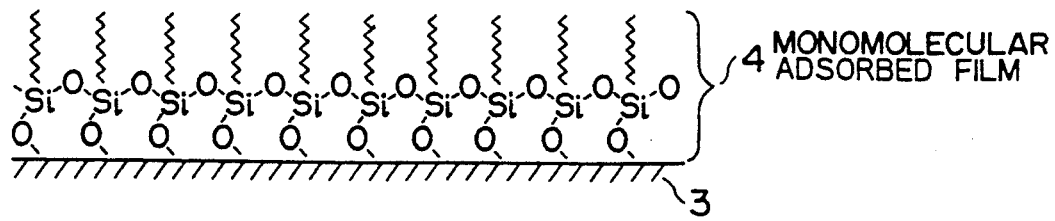
FIG. 3 is a diagram of an encircled portion A in FIG. 1, enlarged up to a molecular level, in which a monomolecular adsorbed film is formed on the surface of a ultra-fine particle.
Figure 4:
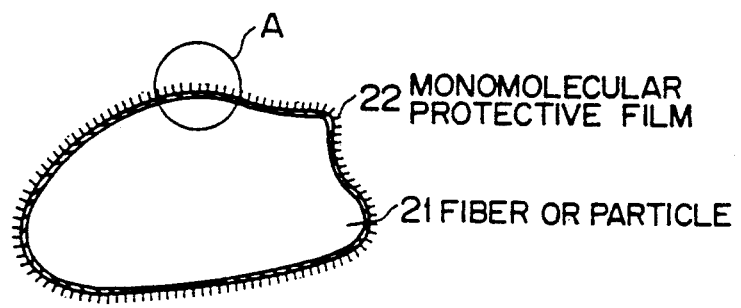
FIGS. 4 to 8 show cross sections of a ultra-fine particle or fiber as a second embodiment of the present invention.

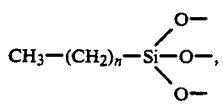

as shown in reaction formula (1) below, $$\sim SiCl_3 + \sim OH \longrightarrow \sim Si-O \sim + HCl. \quad (1)$$

whereby a monolayer of a monomolecular adsorbed film 4 of the silane surface active agent (having a thickness of 20 to 30 Å) is formed on the surface of the ultra-fine particle in a state that the silane surface active agent bonds directly to the surface of the ultra-fine particle (FIG. 3).

In addition, when a trichlorosilane-type surface active agent (in which three chlorine atoms are bonded to one Si) is used, the intermolecular bonding of the trichlorosilane-type surface active agent takes place through —O— bonds as shown in formula (2). Hence, it is possible to form a monomolecular film, which is pinhole-free on a molecular level, on the surface of the ultra-fine particle.

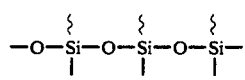

(2)

It is therefore possible to produce a ultra-fine particle of which the surface is covered with a monomolecular adsorbed film and which is very stable in an atmosphere containing oxygen, e.g., in air.

In addition, materials containing a group having bonding ability to an —OH group (e.g. —SiCl, —SH group, etc.) may be used as a material for the chemical adsorption, and the material for the chemical adsorption shall not be limited to the silane-type surface active agent referred to in Example. And the use of a silane-type surface active agent having a straight chain hydrocarbon interrupted by fluorine, e.g. $CF_3-(CH_2)_n-SiCl_3$ (n is an integer and those in which n is about 10 to about 25 are easy in handling) or $CF_3-(CF_2)_m(CH_2)_n-SiCl_3$ (m and n are integers), further improves water repellency and gives more stable ultra-fine particles. When the ultra-fine particles are of metallic oxide such as $Al_2O_3$, $Fe_2O_3$ or $Fe_3O_4$, it is natural that their surface is oxidized in air. Since, however, the surface each of these particles is of oxide, it is clear that they can be formed into ultra-fine particles having a surface covered with a monomolecular film in the same way as discussed hereinabove.

In ultra-fine particles produced in the above process, the ultra-fine particles of a metal or metallic oxide have a monomolecular organic thin film, which is formed on their surfaces in high density without any pinhole in a state that the monomolecular organic thin film is chemically bonded directly thereto. Hence, even if these ultra-fine particles are used in an atmosphere containing oxygen or air, they do not undergo ignition. Further, the organic thin film chemically bonds to the surface of ultra-fine particles, and its thickness is uniform and very small. Hence, the properties inherent to the ultra-fine particle are not impaired.

EXAMPLE 2

Another embodiment will be explained by referring to FIGS. 4 to 8.

A silane surface active agent is allowed to undergo an adsorption reaction on the entire area of the surface of fine particles or fibers 21 [of oxide such as alumina ($Al_2O_3$), silica, glass, $Fe_2O_3$, or $Fe_3O_4$, or of a metal, Fe or Al, and having a particle size of from a few microns to some tens of micron, or having a fiber diameter of from a few microns to some tens of micron and a fiber length of a few millimeters]by a chemical adsorption method, to form a protective film 22 of the silane surface active agent. For example, $CH_3-(CH_2)_n-SiCl_3$ (n is an integer and those in which n is about 10 to about 25 are easy in handling) is used as a silane surface active agent, and the above fine particles or fibers are immersed in a solution of a 80 wt. % n-hexane in which from about $2\times10^{-3}$ to about $5\times10^{-2}$ mol/l of the silane surface active agent is dissolved, 12 wt. % carbon tetrachloride and 8 wt. % chloroform. In this case, since the fine metal particles or fibers have natural oxide formed on their surfaces in the same way as in Example 1, and since the surface of the oxide is naturally oxide, the surfaces contain —OH groups (FIG. 2). As a result, the —$SiCl_3$ group reacts with the —OH group to eliminate hydrochloric acid and form

Figure 5:
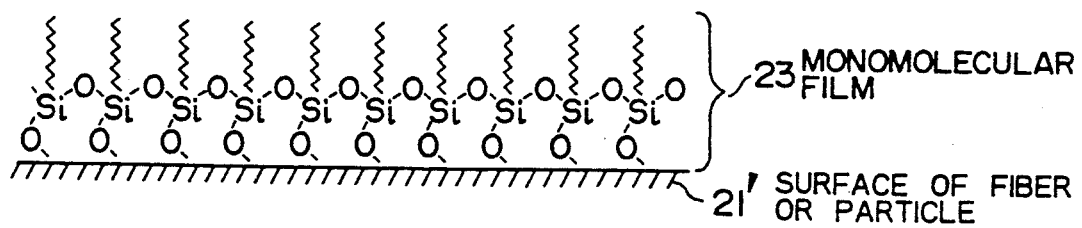

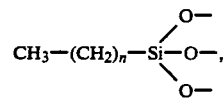

whereby a monolayer of a monomolecular adsorbed film 23 of the silane surface active agent (having a thickness of 20 to 30 Å) is formed directly on each of the surfaces of the fine particles or fibers in a state that the silane surface active agent is bonding to each of the surfaces through —O— bonds (FIG. 5).

Figure 6:
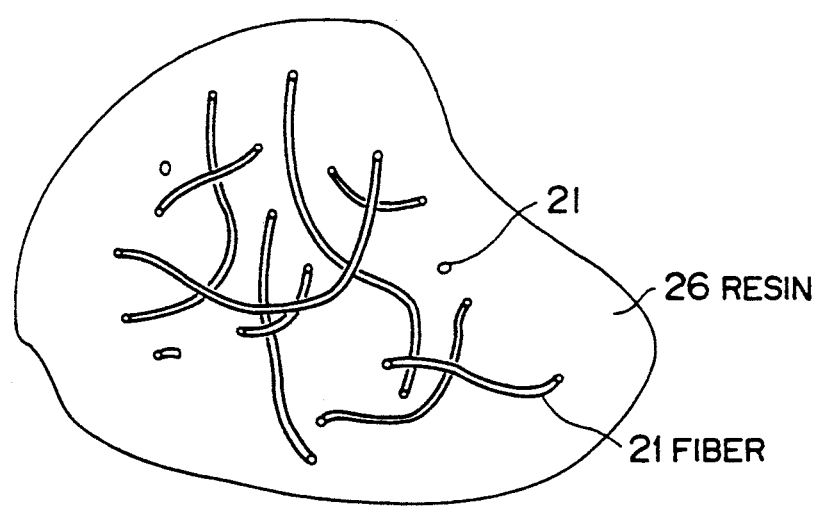

Then, the fine particles or fibers are uniformly dispersed in a material of a synthetic resin 26 (e.g. acrylic resin, or polycarbonate, vinyl chloride, polyamide, or polyester resin material), and thereafter, the dispersion is cured to give a synthetic resin, i.e. a fiber-reinforced plastic (FRP) (FIG. 6).

Figure 7:
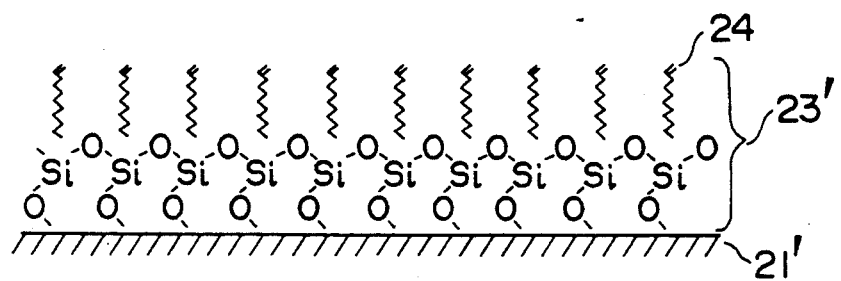

When the silane surface active agent used is $CH_2=CH-(CH_2)_n-SiCl_3$ or $CH\equiv C-(CH_2)_n-SiCl_3$ (n is an integer and those in which n is about 10 to about 25 are easy in handling), it is possible to form a monomolecular film 23' having a state that $CH_2=CH-$ groups or $CH\equiv C-$ groups 24 are arranged on the outward surface (FIG. 7). Thus, these fillers can be chemically bonded directly to acrylic resin or polycarbonate, vinyl chloride, polyamide, or polyester resin material, and the adhesion can be therefore improved to a great extent.

For example, an acrylic resin contains a —C=C— group as shown in formula (3), and can be therefore bonded to the —C=C— group of the monomolecular film 23' formed from the above silane-type surface active agent by using a radical polymerization initiator or irradiation.

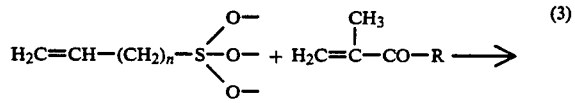

(3)

-continued

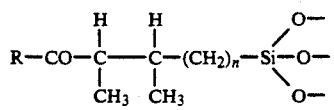

Figure 8:
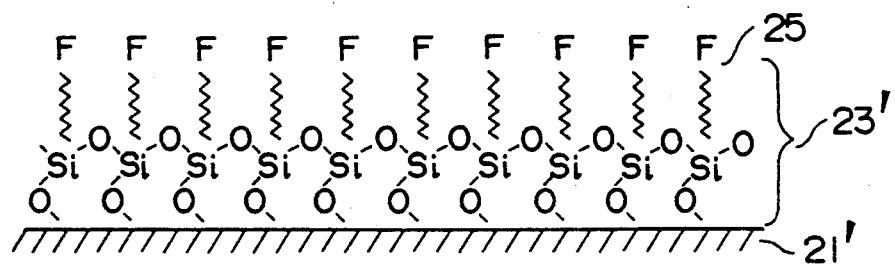

Further, when a fluorine resin is used as a resin material, the use, as a silane surface active agent, of a substance having a fluorine atom-containing terminal group such as —CF$_3$ [e.g. CF$_3$—(CH$_2$)$_n$—SiCl$_3$ (n is an integer, and those in which n is about 10 to about 25 are most easily handled)] makes it possible to form a monomolecular film in a state that —CF groups 25 are arranged on the outward surface as shown in FIG. 8, and can improve the compatibility with the fluorine resin.

Furthermore, when silica is used as fine particles or fibers and an acrylic or polycarbonate resin is used as a resin material, it is possible to obtain a glass-like resin sheet having very high transparency and reliability.

In addition, materials containing a group having bonding ability to an —OH group (e.g. —SiCl, etc.) may be used as a material for the chemical adsorption, and the material for the chemical adsorption shall not be limited to the silane-type surface active agent referred to in Example.

In a filler produced according to the process of the present invention, since its surface is formed in a high density in a state that a monomolecular organic thin film is chemically bonded directly, the adhesion to a resin is very high, and a synthetic resin to which the filler is incorporated does not undergo deterioration even if used in a water-containing atmosphere. The monomolecular film is chemically bonded directly to the surface of the filler, and its thickness is uniform and very small. Hence, the synthetic resin does not cause any peeling of its surface active agent even if used for a long period of time, and has high reliability. Further, the monomolecular film does not impair the characteristics of the filler.

What is claimed is:

1. A metal or metal oxide fiber having a surface covered with a monomolecular film having an outward arrangement of hydrophobic groups, wherein a monomolecular film of a chlorosilane surface active agent is formed on the surface of a metal or metal oxide fiber, said metal or metal oxide fiber containing OH group groups on its surface, by a chemical adsorption reaction between the silicon atoms of the chlorosilane surface active agent and the OH groups of the metal or metal oxide fiber, the monomolecular film being chemically adsorbed directly to the surface of the metal or metal oxide fiber so that the resultant monomolecular film has an outward arrangement of hydrophobic groups.

2. A metal or metal oxide fiber according to claim 1 wherein the chlorosilane surface active agent contains a straight hydrocarbon chain.

3. A metal or metal oxide fiber according to claim 1 wherein the chlorosilane surface active agent is chemically bonded to the entire surface of the metal or metal oxide fiber.

4. A metal or metal oxide fiber according to claim 1 wherein the chlorosilane surface active agent is chemically adsorbed on the surface of the metal or metal oxide fiber in a non-aqueous organic solvent.

5. A metal or metal oxide fiber according to claim 1 wherein the chlorosilane surface active agent is chemically substance represented by CH$_3$—(CH$_2$)$_n$—SiCl$_3$ in which n is an integer, CF$_3$—(CH$_2$)$_n$—SiCl$_3$ in which n is an integer, or CF$_3$—(CF$_2$)$_m$(CH$_2$)$_n$—SiCl$_3$ in which m and n are integers.

6. A metal or metal oxide fiber according to claim 1 wherein the chlorosilane surface active agent is a chemical substance containing a terminal —SiCl group.

7. A metal or metal oxide fiber according to claim 1 wherein the chlorosilane surface active agent is a chemical substance represented by CH$_2$=CH—(CH$_2$)$_n$—SiCl$_3$ or CH≡C(CH$_2$)$_n$SiCl$_3$ in which n is an integer.

8. A metal or metal oxide fiber according to claim 1 wherein the metal or metal oxide fiber is alumina (Al$_2$O$_3$), silica or glass.

9. A metal or metal oxide fiber or fine particle covered with a chemically adsorbed hydrophobic monomolecular film, which is formed and bonded to the surface of a metal or metal oxide fiber or fine particle by a chemical adsorption reaction between chlorosilyl groups of chlorosilane surface active agent molecules having some chlorosilyl groups and OH groups of the metal or metal oxide fiber or fine particle having OH groups at the surface, and in which the chemically adsorbed molecules forming the monomolecular film are arranged along the surface of the metal or metal oxide fiber or fine particle.

10. A metal or metal oxide fiber or fine particle according to claim 9 wherein the chlorosilane surface active agent contains a straight hydrocarbon chain.

11. A metal or metal oxide fiber or fine particle according to claim 9 wherein the chlorosilane surface active agent is chemically bonded to the entire surface of the metal or metal oxide fiber or fine particle.

12. A metal or metal oxide fiber or fine particle according to claim 9 wherein the chlorosilane surface active agent is chemically adsorbed on the surface of the metal or metal oxide fiber or fine particle in a non-aqueous organic solvent.

13. A metal or metal oxide fiber or fine particle according to claim 9 wherein the chlorosilane surface active agent is a chemical substance represented by CH$_3$—(CH$_2$)$_n$—SiCl$_3$ in which n is an integer, CF$_3$—(CF$_2$)$_n$—SiCl$_3$ in which n is an integer or CF$_3$—(CF$_2$)$_m$(CH$_2$)$_n$—SiCl$_3$ in which m and n are integers.

14. A metal or metal oxide fiber or fine particle according to claim 9 wherein the chlorosilane surface active agent is a chemical substance containing a terminal —SiCl$_3$ group.

15. A metal or metal oxide fiber or fine particle according to claim 9 wherein the chlorosilane surface active agent is a chemical substance represented by CH$_2$=CH$_{13}$ $_{(CH2)}$$_n$—SiCl$_3$ or CH≡C(CH$_2$)$_n$—SiCl$_3$ in which n is an integer.

16. A metal or metal oxide fiber or fine particle according to claim 9 wherein the metal or metal oxide fiber or fine particle is alumina (Al$_3$O$_2$), silica or glass.

* * * * *

UNITED STATES PATENT AND TRADEMARK OFFICE
CERTIFICATE OF CORRECTION

PATENT NO. : 5,209,976
DATED : May 11, 1993
INVENTOR(S) : Kazufumi OGAWA It is certified that error appears in the above-identified patent and that said Letters Patent is hereby corrected as shown below:

Column 5, line 45, after "agent" the following should be inserted: --having at least one chlorosilyl group therein--.

Column 5, line 49, "silicon atoms" should read --chlorosilyl group--.

Column 6, lines 20, 27, 31, 32, 35, 38, 39, 42, 44, 51, 55, 60 and 62, "or fine particle" should be deleted.

Column 6, line 23, "or fine particle" should read:

-- through -SiO-groups --.

Column 6, line 26, "some" should be deleted.

Signed and Sealed this

Ninth Day of August, 1994

Attest:

BRUCE LEHMAN

Attesting Officer     Commissioner of Patents and Trademarks